United States Patent [19]

Funcke

[11] 4,159,186

[45] Jun. 26, 1979

[54] BALL JOINT, PARTICULARLY FOR USE IN MOTOR VEHICLES

[75] Inventor: Thomas R. Funcke, Meerbusch, Fed. Rep. of Germany

[73] Assignee: A. Ehrenreich GmbH & Co. KG, Düsseldorf, Fed. Rep. of Germany

[21] Appl. No.: 913,588

[22] Filed: Jun. 8, 1978

[30] Foreign Application Priority Data

Jun. 18, 1977 [DE] Fed. Rep. of Germany ....... 2727429

[51] Int. Cl.² .............................................. F16C 11/06
[52] U.S. Cl. ...................................... 403/140; 403/114
[58] Field of Search ............... 403/135, 139, 140, 137, 403/114; 308/239, 72

[56] References Cited

U.S. PATENT DOCUMENTS

| | | | |
|---|---|---|---|
| 1,266,061 | 5/1918 | Scoville | 308/72 UX |
| 1,780,383 | 11/1930 | Green | 403/114 X |
| 2,614,873 | 10/1952 | Booth | 403/129 |
| 2,754,141 | 7/1956 | Latzen | 403/140 X |
| 3,260,543 | 7/1966 | Henry-Biabaud | 403/140 |
| 3,409,317 | 11/1968 | Richards | 403/137 X |
| 3,413,023 | 11/1968 | Herbenar | 403/135 |
| 3,802,789 | 4/1974 | Patton | 403/135 |
| 3,989,320 | 11/1976 | McCloskey | 308/72 |

Primary Examiner—Andrew V. Kundrat
Attorney, Agent, or Firm—Ernest F. Marmorek

[57] ABSTRACT

A ball joint includes one member having a socket portion which has an internal support surface bounding a cavity, and another member having a mounting portion which is received in the cavity, and has a spherical contact surface that contacts the support surface, and thus mounts the two members for relative pivotal movement about at least two axes. The movement about one of the axes is made easier than about the other axis by providing the support surface with at least one zone which has a center located on the one axis, and which so engages the contact surface as to oppose the relative movement of the members with a higher frictional force per unit area, than the remainder of the support surface.

8 Claims, 4 Drawing Figures

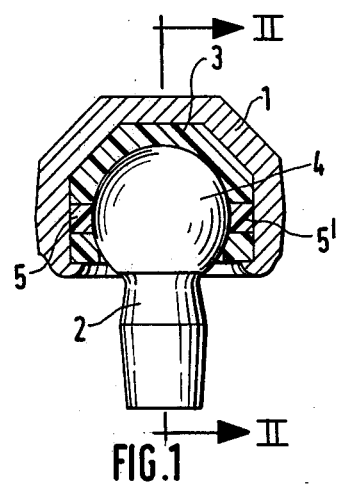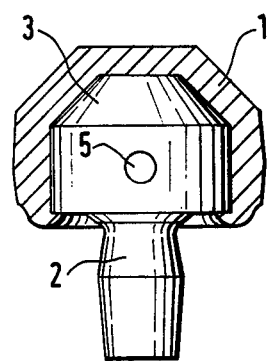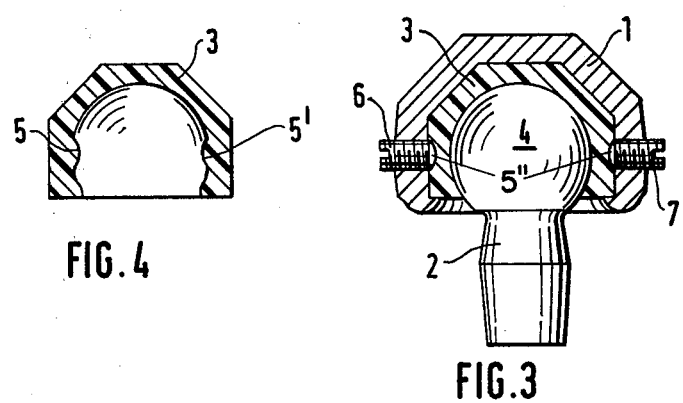

BALL JOINT, PARTICULARLY FOR USE IN MOTOR VEHICLES

BACKGROUND OF THE INVENTION

The present invention relates to a ball joint in general, and more particularly to a ball joint, which can be profitably used in the steering or wheel-suspending system of a motor vehicle.

Ball joints of this general type are already known and in widespread use, particularly in the motor vehicle manufacturing industry. Joints of this type must be so constructed as not to permit any play between the two members which together constitute the ball joint and one of which has a spherical mounting portion, and the other of which has a socket portion which bounds a spherical cavity that receives the spherical mounting portion of the above-mentioned member. On the other hand, the two members must be capable of moving relative to one another with relative ease. Until now, it has not been possible to satisfy both of these requirements in an ideal manner, without incurring extraordinarily high manufacturing expenses. Moreover, it has been established that, in order to improve the response of the ball joint of this type to forces acting on the movable member thereof, and thus to enhance the comfort of the ride in a vehicle equipped with a ball joint, or ball joints of this type, an additional requirement is to be met, namely that the pivotal movement of the movable member of the ball joint relative to the other member of the ball joint is to be easier, when the movable member pivotally moves about one axis of rotation, than when it moves about another axis of rotation.

In this latter connection, it has already been proposed, in U.S. Pat. No. 2,614,873, to so construct the ball joint, so that the mounting portion of one of the members thereof is apportioned and presents different contact surfaces subjected to loads or stresses of different magnitudes for the rotational movement, on the one hand, and for the pivotal movement, on the other hand. As a result of this, the rotational movement about the axis of the one member which has the mounting portion is made relatively easy, while the pivoting movement in all other directions is made more difficult. However, this conventional arrangement is rather complex, expensive, prone to malfunction, and subject to substantial wear, particularly in view of the fact that the separate contact surfaces of the mounting portion have relatively small areas.

SUMMARY OF THE INVENTION

Accordingly, it is the general object of the present invention to avoid the above-mentioned disadvantages.

A more particular object of the present invention is to provide a ball joint which renders it possible for the movable member of the ball joint to readily respond to any forces acting on the movable member in one direction, while being substantially less responsive to forces acting thereon in any other direction.

A further object of the present invention is to so design the ball joint, as to be simple in construction, easy and inexpensive to manufacture, and reliable and durable in operation.

In keeping with these objects and others which will become apparent hereafter, one feature of the present invention resides in a ball joint, particularly for use in the steering, wheel-suspension and similar systems of a motor vehicle, which comprises a first member including a socket portion having a substantially spherical internal support surface bounding a cavity, a second member including a mounting portion received in the cavity of the first member, and having a substantially spherical external contact surface which slidingly contacts the support surface to mount the second member for pivotal movement about at least two axes relative to the first member, and means for making the movement about one of the axes easier than about the other of the axes, including at least one zone of the support surface having a center located on the one axis, and so engaging the contact surface, as to oppose the movement of the second member relative to the first member with a higher frictional force per unit area than the remainder of the support surface. Advantageously, the above-mentioned zone has an area amounting to a fraction of that of the support surface.

When the above-mentioned one axis does not coincide with the longitudinal axis of the second member, it is further advantageous and proposed by the present invention to provide an additional zone similar to the above-mentioned zone diametrically opposite to the above-mentioned zone. When the ball joint is constructed in the last-mentioned manner, the movable member thereof can be profitably used as a wheel axle of the motor vehicle. Then, the above-mentioned zones are so arranged, that the one axis extends substantially horizontally. In this manner, it is possible for the movable member of the ball joint which constitutes the wheel axle to readily yield to forces acting in the vertical direction, so that the wheel mounted on the wheel axle will be capable of closely following the surface of the road on which the vehicle is traveling, while the pivoting movement of the wheel axle will be rendered more difficult by the provision of the above-mentioned zones, as a result of which the tendency of the wheels to wobble or flutter about the vertical axis will be counteracted, at least to some extent, and thus, the respective wheel mounted on the wheel axle will be capable of maintaining its selected position, thus making the steering of the vehicle in the desired direction less cumbersome.

According to a further advantageous aspect of the present invention, the socket portion of the first member includes a socket body having at least one recess therein, and at least one insert received in the recess having an engaging surface constituting the above-mentioned one zone. Advantageously, the insert is of a material having a frictional coefficient exceeding that of the socket body. On the other hand, it is also contemplated by the present invention to provide means for urging the insert with a predetermined force against the contact surface of the mounting portion of the second member, the urging means including a spring or an adjusting element displaceably mounted on the socket member and pressing against the insert.

According to a further advantageous concept of the present invention, the insert may have a thickness as defined in the radial direction of the socket body, which exceeds the depth of the recess taken in the same direction, the insert being resiliently yieldable to prestress on the contact surface of the mounting portion of the second member. However, it is also proposed, according to a further advantageous facet of the present invention, to provide the socket portion of the first member with a socket body of resiliently yieldable material which has an inwardly extending protrusion, which constitutes the one zone. In each of these instances, either the resiliently yieldable insert, or the resiliently yieldable protrusion will be compressed during and upon the introduction of the mounting portion of the second member into the cavity of the first member, so that this compressed zone will exert a higher force on the contact surface of the mounting portion than the remainder of the support surface of the socket portion, as a result of which the friction between these support surface zones and the contact surface will be higher than between the remainder of the support surface and the contact surface.

The invention itself, both as to its construction and its method of operation, will be best understood, together with additional advantages and objects thereof, from the following description of specific embodiments, when read in connection with the accompanying drawing.

BRIEF DESCRIPTION OF THE DRAWING

FIG. 1 is a longitudinal sectional view of a ball joint of the present invention;

FIG. 2 is a longitudinal partially sectioned view taken on lines II—II of FIG. 1;

FIG. 3 is a sectional view of a socket member with internal protrusions, wich can be used in the ball joint of FIG. 1, and FIG. 4 is a view similar to FIG. 1, with two precompressed zones of increased frictional resistance.

DETAILED DESCRIPTION OF THE PREFERRED EMBODIMENTS

Referring now to the drawings in general, it is to be mentioned first that the several Figures thereof disclose several variants embodying the basic concept of the present invention, which variants are so similar to one another than the same reference numerals have been used throughout to designate corresponding elements or parts. So, for instance, the reference numeral 1 has been used to designate a support element of a socket element which also includes a socket member 3, which is supported in a conventional manner in the support element 1. The socket member 3 has an internal support surface which bounds a substantially spherical cavity, and a mounting portion 4 of a member 2, which has a substantially spherical external contact surface, is received in the cavity of the socket member 3 for pivotal movement along or within a plurality of planes, while the contact surface 4 contacts the support surface of the socket member 3.

Turning now to FIGS. 1 and 2, it may be seen therein that the support surface of the socket member 3 for supporting the contact surface of the mounting portion 4 of the member 2, is provided with two support surface zones 5 and 5', which zones so act on the contact surface of the mounting portion 4 as to oppose the movement of the member 2 relative to the socket element 3, with a higher frictional force per unit area than the remainder of the support surface of the socket member 3. The two zones 5 and 5' of FIGS. 1 and 2 are arranged diametrically opposite to one another. On the other hand, FIG. 3, which is based on the same principle, has only one zone 5", which has the same properties as the above-discussed zones 5 and 5', but which is located on and around the longitudinal central axis of the socket elements 1, 3, of the ball joint.

In the constructions illustrated in FIGS. 1 to 3, the zones 5, 5', or 5", are constituted by inserts which are accommodated in corresponding recesses of the socket member 3. These inserts which constitute the zones 5, 5', or 5", may also be of a resiliently yieldable material, and may have a thickness as defined in a radial direction of the socket member 3 which exceeds the depth of the corresponding recess in the socket member 3, taken along the same direction, so that these inserts forming the zones 5, 5', or 5" will protrude into the cavity of the socket member 3 prior to the assembly of the ball joint, and will prestress the contact surface of the mounting portion 4 of the member 2, in the assembled condition of the ball joint, as the result of which the friction encountered at the support surface zones 5, 5', or 5" will exceed the friction present at the remainder of the support surface of the socket member 3.

The ball joint, according to FIG. 1, permits pivoting with a relative ease only about the axis which passes through the centers of the two zones 5 and 5', and is located in the plane of FIG. 1, while a substantially increased resistance will be offered by the zones 5 and 5' to movement of the member 2 about any other pivotal axis. On the other hand, in the ball joint according to FIG. 3, due to the location of the zone 5", the mounting portion 4 can easily move only about the longitudinal axis of the member 2. A considerably increased resistance is offered by the zone 5", to pivotal movement of the member 2, in any other direction.

As illustrated in FIG. 4, the zones 5 and 5' are constituted by compressed regions of the socket member 3, screws 6 and 7 pressing radially inwardly against the zones 5, 5', to thereby compress the zones 5, 5', and thus increase the force which these zones 5, 5' exert on the contact surface of the mounting portion 4 of the member 2. In this manner, the friction between the support surface zones 5, 5' and the contact surface of the mounting portion 4 of the member 2 is increased, as compared to that with which the remainder of the support surface of the socket member 3 exerts on the contact surface of the mounting portion 4 of the member 2. In this connection, it is to noted that the screws 6 and 7 could also be used to press the inserts having the zones 5, 5", or 5' illustrated in FIGS. 1 to 3, against the contact surface of the mounting portion 4 of the member 2. Also, springs could be used instead of the screws 6 and 7, so long as the springs are so mounted as to exert a radially inwardly oriented force on the respective zone 5, 5', or 5", or on the insert constituting the zones 5, 5', or 5".

Finally, FIG. 5 illustrates a construction of the ball joint in which the zones 5, 5' are constituted by regions of increased thickness in the socket member 3, which is of resiliently yieldable material. The regions of increased thickness have inwardly projecting protrusions thereon, which are compressed during and subsequent to the assembly of the socket element 1, 3 with the member 2, so that the compressed regions of the socket member stress the mounting portion 4 of the member 2. As a result of this, the friction at the zones 5, 5' constituted by the compressed regions of the socket member 3 exceeds that encountered at the remainder of the support surface of the socket member 3. Here again, the member 2 will move with a relative ease with respect to the element 3, about the axis of the zones 5, 5', while a relative pivotal movement of the member 2 about any other axis will be impeded to some extent.

The differential behavior of the ball joint of the present invention and especially its favored pivotal movement about the axis of the zone or zones 5, 5' is attributable to the following facts. First of all, let it be assumed that the two zones 5, 5', having an increased friction coefficient, and provided on the socket member 3, are juxtaposed with the equator of the mounting portion 4 of the member 1, and are arranged diametrically opposite one another. Now, when the member 2 is pivoted about an imaginary axis which passes through the centers of the zones 5, 5', there is required a certain force to accomplish this movement, which is proportional to the radius $R_Z$, the radius $R_Z$ being defined as the perpendicular distance of the respective zone from the center of the ball joint, when rotating the ball joint about an axis passing through the center point of the two zones, and to the frictional coefficient of the zones 5, or 5', as well as to the friction of the remainder of the support surface of the socket member 3 with the contact surface of the mounting portion 4 of the member 2. On the other hand, if it is attempted to pivot the member 2 about a different axis, it is necessary to exert an additional force on the member 2 beyond the above-mentioned force, which additional force is proportional to the perpendicular distance $R_A$ of the central point of the zones 5 or 5' of increased friction from this other axis of rotation, as well as to the frictional coefficient of the zones 5 or 5', while the frictional force between the remainder of the support surface of the socket member 3, and the contact surface of the mounting portion 4 of the member 2 remains unchanged. When the other axis of rotation is normal to the axis which extends through the central points of the zones 5 and 5', then the radius $R_{Amax}$ equals the radius of the mounting portion 4 of the member 2. Thus, the frictional resistance moments which hamper the free movement of the member 2 with respect to the socket member 3, are defined by the following ratio:

$$Md_L:Md_S=R_Z:(R_Z+R_A),$$

wherein $Md_L$ is the minimum frictional resistance moment about an axis passing through the center of the zones 5 and 5', and $Md_S$ is the actual frictional resistance moment about any other axis of rotation, while the symbols $R_Z$ and $R_A$ have the meanings defined above.

Thus, it may be seen that, due to the provision of the zones of 5 and/or 5' of increased friction, the movement about the axis passing through the center of the zones 5 and/or 5', is favored, while pivoting about any other axis is rendered more difficult. In this manner, it is possible to control the response of the movable member 2 of the ball joint to forces acting thereon in correspondence to the requirements which are to be satisfied by the ball joint.

It will be appreciated that each of the elements as described above, or two or more together, may also find useful application in other types of constructions which differ from the type described above. So, for instance, the ball joint can be used in other applications, wherever it is desired to favor pivoting in one direction over pivoting in another direction.

While the invention has been illustrated and described as embodied in a ball joint employed for mounting a wheel axle on the frame of a motor vehicle, it is not intended to be limited to the details which have been shown, inasmuch as various modifications and structural changes may be made without departing in any manner from the spirit of the present invention.

The foregoing will so fully reveal the gist of the present invention, that others can, by applying current knowledge, readily adapt it for various applications without omitting features which fairly constitute essential characteristics of the general or specific aspects of this invention from the standpoint of prior art.

What is claimed as novel and desired to be protected by Letters Patent is set forth in the appended claims:

1. A ball joint, particularly for use in the steering, wheel-suspending and similar systems of a motor vehicle, comprising in combination:

a first member including a socket portion having a substantially spherical internal support surface bounding a cavity, a second member including a mounting portion received in said cavity of said first member and having a substantially spherical external contact surface to mount said second member for pivotal movement about at least two axes relative to said first member, and means for making the movement about one of said axes easier than about the other of said axes, including two zones of said support surface disposed diametrically opposite one another around a largest ball diameter, having respective centers located on said one axis, each zone being similar to the other zone, and having an area amounting to a fraction of said support surface, and so engaging said contact surface as to oppose the movement of said second member relative to said first member with a higher frictional force per unit area than the remainder of said support surface.

2. A ball joint as defined in claim 1, wherein said socket portion of said first member includes a socket body of a resiliently yieldable material, and wherein said means for making the movement easier includes at least one inwardly extending protrusion of said socket body which constitutes said one zone.

3. A ball joint as defined in claim 1, wherein said socket portion of said first member includes a socket body having at least one recess therein, and at least one insert received in said recess, and having an engaging surface constituting said one zone.

4. A ball joint as defined in claim 3, wherein said insert is of a material having a frictional coefficient exceeding that of said socket body.

5. A ball joint as defined in claim 3, wherein said insert has a thickness as defined in the radial direction of said socket body which exceeds the depth of said recess taken in the same direction, and is resiliently yieldable to prestress the contact surface of said mounting portion of said second member.

6. A ball joint as defined in claim 3, wherein said means for making the movement easier includes means for urging said insert with a predetermined force against said contact surface of said mounting portion of said second member.

7. A ball joint as defined in claim 6, wherein said urging means includes a spring.

8. A ball joint as defined in claim 6, wherein said urging means includes an adjusting element displaceably mounted on said socket member and pressing against said insert.

* * * * *